Oct. 4, 1960
G. E. NICHOLS
2,954,625
EASEL-TYPE DESK MOUNTS
Filed Oct. 20, 1959
3 Sheets-Sheet 1
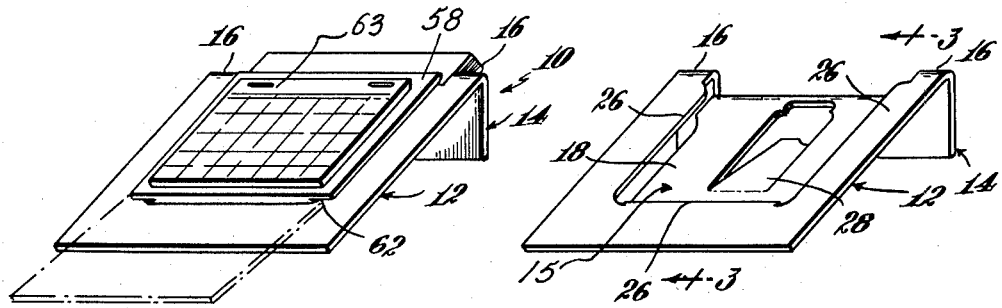
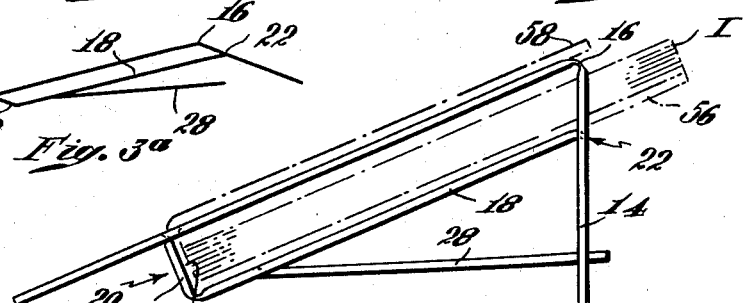
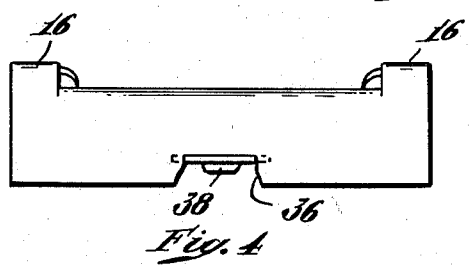
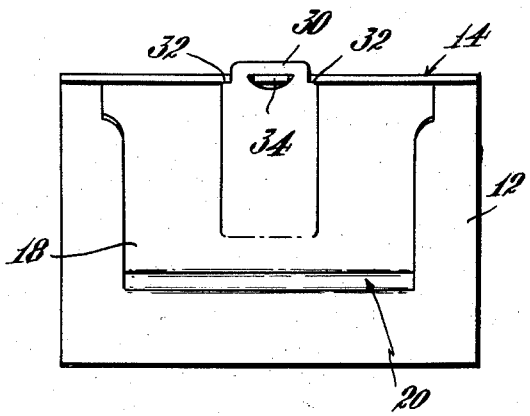
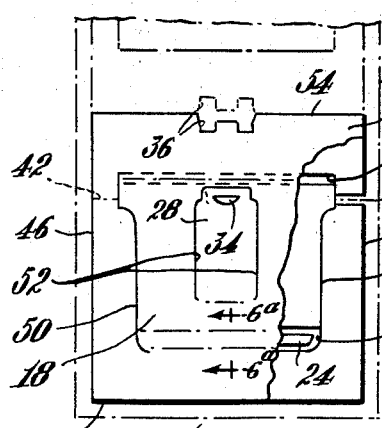
Inventor
Gordon E. Nichols
by Roberts, Cushman & Grover
Attys Oct. 4, 1960

G. E. NICHOLS 2,954,625

EASEL-TYPE DESK MOUNTS

Filed Oct. 20, 1959

Inventor
Gordon E. Nichols
by Roberts, Cushman & Grover
Attys

Oct. 4, 1960    G. E. NICHOLS    2,954,625
EASEL-TYPE DESK MOUNTS
Filed Oct. 20, 1959    3 Sheets-Sheet 3

Inventor
Gordon E. Nichols
by Roberts, Cushman & Grover
Att'ys

United States Patent Office 2,954,625
Patented Oct. 4, 1960

2,954,625

EASEL-TYPE DESK MOUNTS

Gordon E. Nichols, Middleboro, Mass., assignor to Winthrop-Atkins Co., Inc., Middleboro, Mass., a corporation of Massachusetts Filed Oct. 20, 1959, Ser. No. 847,496

10 Claims. (Cl. 40—120)

This invention relates to mounts for photographs, calendar pads, memorandum pads and the like.

The principal object of the invention is to provide a single ply mount having a faceboard with an opening therethrough, and a backboard spaced rearwardly therefrom to afford a well adapted to receive an insert in the form of a photograph or pad. Another object is to provide a single ply mount of the foregoing kind in which the depth of the well may be increased, decreased or varied in depth from one end to the other. Another object is to provide a mount of the foregoing kind in which the conventional spacer or spacers and faceboard plies are not required in the formation of the well, but which may optionally have a frontboard for providing a secondary pocket or for decorative purposes. Other objects are to provide a mount of the foregoing kind which preferably requires but a single ply or board for its manufacture, thereby minimizing the number of covering operations, minimizing assembly operations and effecting economies in material and labor. Another object is to provide a mount of the foregoing kind to which a frontboard may optionally be added without changing the basic structure and the economies of manufacture realized thereby.

As herein illustrated, the mount comprises a backboard having an upper portion of predetermined transverse width and a lower portion of narrower width, a U-shaped faceboard spaced forwardly of and parallel to the backboard, the faceboard having spaced parallel legs paralleling the lateral edges of the narrower lower portion of the backboard, and a transverse leg paralleling the transverse end of the narrower portion. A flexible hinge element extends rearwardly from the transverse leg of the faceboard to the parallel transverse lower edge of the narrower portion of the backboard, forming the sole connection between these edges, and other flexible hinge elements extend rearwardly from the upper ends of the legs to the upper portion of the backboard and constitute the sole connections between the upper ends of the legs and the backboard. These latter hinges are narrower in width than the legs and are offset from the inner edges of the legs, leaving openings between the backboard and the upper ends of the legs, inwardly of the hinges, which are in communication with the space between the backboard and the faceboard, forming a mouth through which an insert may be thrust to dispose its lateral edges behind the inner edges of the legs. The hinge element connecting the lower leg of the faceboard to the lower edge of the backboard constitutes a support for the insert. The upper portion of the backboard may constitute a support for the mount, either by containing an aperture, by means of which the mount may be suspended, or by having a transversely extending hinge spaced from and parallel to the hinges joining the ends of the legs thereto, the ends of the transversely extending hinge terminating adjacent the ends of the leg hinges so that, that portion of the backboard beyond the transverse hinge, is foldable relative to the part forwardly thereof to provide a supporting leg.

The backboard and faceboard are integral portions of a single ply of board, cut through at appropriate places and covered on one or both sides with a flexible facing material which constitutes the several hinges. If desired, a narrow stiff insert may be interposed between adjacent edges prior to covering with the flexible facing material, for example, between the transverse leg of the faceboard and the parallel transverse lower edge of the narrower portion of the backboard so as to provide substantial front-to-back depth between the faceboard and the backboard. The depth of the bottom hinge member from front to back preferably corresponds to the distance between the hinges connecting the upper end of the legs to the backboard and the transverse leg hinge in the backboard, however, it may be made narrower so as to cause the backboard and face board to converge slightly, thereby to grip the lower part of an insert thrust into the opening between the face board and the backboard.

The basic structure, as described, is constituted of a single ply, however, an independent frontboard may be placed over the faceboard to conceal the open top of the opening between the faceboard and backboard, or to provide an additional pocket.

The means for locking the faceboard and leg at a suitable angle is constituted by a brace hinged to the backboard at its lower end for folding downwardly into engagement with the leg and has at its free end a tongue flanked by laterally spaced shoulders and an aperture through it. The leg has an aperture into which extends a tongue. The tongue and apertures of the respective parts are so portioned that when interengaged the shoulders at opposite sides of the tongue on the brace bear firmly against the leg marginally of its aperture.

The invention will now be described in greater detail with reference to the accompanying drawings wherein:

Fig. 1 is an isometric view of one form of the mount which has an insert in the form of a folder within which there may be placed a memorandum pad, the folder having a front face on which may be attached a calendar pad;

Fig. 2 is a corresponding view with the folder removed;

Fig. 3 is a vertical section taken on the line 3—3 of Fig. 2, showing the folder and memorandum pad in dotted lines;

Fig. 3a is a diagrammatic line drawing of the mount partially collapsed illustrating its basic quadrilateral construction;

Fig. 4 is a rear elevation of the mount as shown in Fig. 3;

Fig. 5 is a bottom view of the mount as shown in Fig. 3;

Fig. 6 is a fragmentary plan view broken away in part showing a method of making a pair of blanks;

Fig. 6a is a section taken on the line 6a-6a of Fig. 6;

Fig. 17 is a plan view of a modified form of the mount adapted for suspension from a wall;

Fig. 18 is an edge view taken on the line 18—18 of Fig. 17;

Fig. 19 is an end view of the mount showing the pocket with a calender situated therein;

Figure 7:
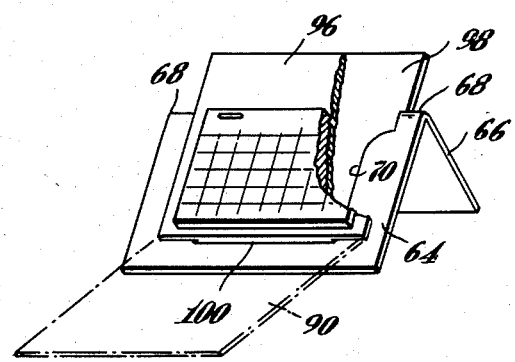
Fig. 7 is an isometric view of a modification of the mount containing an insert in the form of a folder which has within it a place for telephone numbers and the like, and a front face for supporting a calendar pad.
Figure 8:
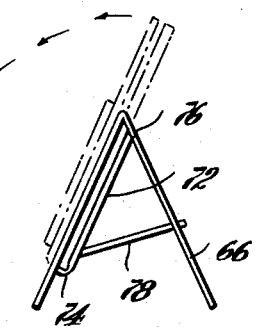
Fig. 8 is an end view of Fig. 7.

Fig. 20 discloses the mount supported from its lower edge; and

Fig. 21 is a plan view of the blank.

Referring to Figs. 1 to 5 inclusive, the mount 10 is comprised of a faceboard 12 and leg 14, which are joined by hinges 16—16 so that they may be disposed with the leg in a substantially vertical position with reference to a support, as shown in Fig. 3, and with the faceboard inclined upwardly and rearwardly. The faceboard has in it an opening 15 below which is a well having a bottom constituted by a backboard 18 which was formerly a part of the faceboard and which is connected at its lower end to the faceboard by a double hinge 20 and at its upper end to the leg by a single hinge 22. The double hinge 20 is constituted by a narrow stiff insert 24 (Fig. 6a) interposed between the lower edge 26 of the opening in the faceboard and the lower edge of the bottom board 18, with its edges hinged respectively to the faceboard and bottom board, so that in effect the lower end of the bottom board is suspended beneath the faceboard. The insert 24 affords a ledge or shelf for supporting the lower edge of an insert placed in the well. The hinge 22 at the upper end of the bottom board is below the hinge 16—16 which connects the faceboard to the leg by an amount which corresponds substantially to the width of the hinge insert 24. The opening 15 in the faceboard extends through the upper end of the faceboard and its side edges deviate near the top so as to provide a wide mouth to permit thrusting an insert endwise into the well. The sides of the well are open so that the edges of an insert corresponding in width to the mouth will lie beneath the edges of the faceboard, the latter extending inwardly of the mouth and providing retainers 26—26 which engage the face of the insert at its edges and hold it therein.

The leg 14 is held in its operative position by a brace 28. As herein illustrated, the brace 29 is hinged (Fig. 5) at its forward end to the bottom board 18, for example, by scoring or embossing, and at its rear end is provided with a tongue 30 which is somewhat narrower than the remainder of the brace so that there are flanking, laterally spaced shoulders 32—32. A lenticular opening 34 is punched through the tongue with its flat side parallel to the shoulder 32—32 and spaced therefrom by an amount corresponding to the thickness of the board. The leg 14 in turn has a notch 36 (Fig. 4) in its lower edge which corresponds substantially in width at its bottom to the tongue 30 on the brace, and a tab 38 which extends downwardly into it from its bottom which corresponds substantially in width to the length of the lenticular opening 34 in the brace. The brace and leg are interengaged by pushing the tongue 30 into the recess 36 so as to engage the tab 38 with the opening 34. When thus engaged the shoulders 32—32 bear firmly against the inside of the leg thus rigidly bracing the leg with respect to the faceboard so that there is no tendency for the mount to wobble. This is particularly desirable for the reason that the mount is used for supporting a memorandum pad as it is desirable that it be steady when a person is writing, that is, making notes on the pad.

The mounts, shown in Figs. 1 to 5, are made in pairs as shown in Fig. 6, with the lower edges of the legs adjacent each other. As shown, a single ply board $b$ is first operated upon to make two groups of oppositely disposed slots transversely thereof. Each group of slots consists of a slot 40, a pair of aligned slots 42—42 and a slot 44. The distance between the slots 40 and 44 correspond substantially to the length of the bottom board 18 and their lengths correspond substantially to the width of the bottom board. The distance between the slot 40 and the pair of aligned slots 42—42 correspond substantially to the depth of the well. The inner ends of the slots 42—42 commence opposite the outer ends of the slot 40 and extend outwardly therefrom to what will be the side edges of the mount. The slot 44 is, in this form of the invention, wider than the slot 40, corresponding substantially in width to the depth of the well. After cutting out the material to form the slots 40, 42 and 44, facing paper $f$ is applied to one side of the board so as to cover the slots. The board is then operated on to trim off the edges along the lines 46—46 which pass through the outer ends of the slots 42—42 and along lines 48—48 which determine the overall length of the two blanks base to base. The double blank is now turned over, the narrow hinge insert 24 is placed in each of the slots 44, whereupon facing paper $f'$ is applied to this side and wrapped around the edges. The completely wrapped double blank is now subjected to further cutting along lines 50—50 which extend from the outer ends of the slot 44 to the outer ends of the slot 40, these cuts deviating as they approach the slot 40 so as to pass through the inner ends of the double slots 42—42. Additional cuts 52—52 are made between the cuts 50—50 and the slots 40 and 44 to separate the brace 28 from the bottom board 18 and a cut 54 is made to separate the two blanks. Simultaneously, the lenticular apertures 34 are punched through the braces and the two recesses 36 are punched base to base at the adjacent ends of the double blank. The blanks are now separated and are ready for folding by grasping the faceboard and leg and bending them on the hinges 16—16 which are constituted by the pair of covered slots 42—42.

The location of the respective slots 40, 42—42 and 44, which provide the hinges 16—16, 20 and 22, connect the component parts of the mount in the form of a parallelogram linkage (Fig. 3a), so that when the faceboard and leg are folded on the hinges 16—16, the bottom 18 is automatically displaced downwardly with respect to the faceboard on the hinges 20 and 22, which are of substantially equal radius. When the leg and faceboard have reached their proper position, as shown in Fig. 3, the brace 28 is folded down and engaged within the recess 36.

The mount, as shown in Figs. 1 to 5 inclusive, has a very short supporting leg which is disposed in a substantially vertical position and the faceboard is inclined at a very low angle which makes it particularly suitable for an insert in the form of a memorandum pad upon which may be jotted memoranda. If desired, a covering folder may be used with this mount for concealing the memorandum pad when not in use and for supporting a calendar pad. Thus, as shown in Figs. 1 and 3, the folder has back and front leaves 56 and 58, joined by a bottom hinge 60 which is slotted at its ends at 62—62. The folder is inserted in the well by engaging the slot 62—62 with the top and bottom sides of the edges 26—26 and sliding it downwardly into the well. The memorandum pad may be placed between the leaves either before or after the folder is inserted, and a calendar pad 63 may be stapled or otherwise attached to the front leaf 58. When the memorandum pad is not being used, the leaf 58 and calendar pad will conceal the memorandum pad. When it is desired to use the memorandum pad the leaf 58 may be folded forwardly to the dotted line position shown in Fig. 1, thereby to expose the memorandum pad.

Figs. 7 to 10 inclusive, show a modification of the mount wherein the faceboard and supporting leg are substantially equal in length so that the mount sets in a more upright position. As there shown, the faceboard 64 is connected to the leg 66 by hinges 68—68, the faceboard has an opening 70 below which is a well having a bottom board 72 supported from the faceboard and the leg respectively, by hinges 74 and 76. In contrast to the previously described mount, the hinge 74 is constructed so that the distance between the lower end of the back or bottom board 72 from the faceboard is less than the distance between the upper end of the bottom board and the hinges 68—68. This produces a pinching or squeezing action on the insert when the mount is set up so as to assist in holding the insert in place. As in the previously described mount, a brace 78 is hinged to the bottom board 72 for engagement by rearward folding with the leg 66. The brace has a tongue 80 flanked by shoulders 82—82 and a lenticular opening 84. Unlike the prior mount, the means for interlocking engagement with the brace is located above the lower end of the leg and is in the form of an aperture 86 into which projects a tab 88.

As in the previous mount, a folder consisting of front and rear leaves 96 and 98, connected by a bottom hinge 100, may be used for providing within it a surface for receiving telephone numbers and the like, and on its front face, a support for a calendar pad 96. The opposite ends of the hinge 100 are slotted at 102—102 so that the folder may be inserted into the pocket with the front leaf 96 overlying the faceboard and the back leaf underlying it. By folding the front leaf 96 forwardly the telephone listing may be exposed for reference.

Figures 9, 9A:
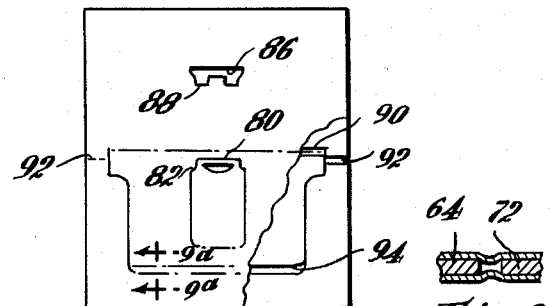
Fig. 9 is a plan view of a completed blank partially broken away from which the mount shown in Figs. 7 and 8 is made prior to folding.
Fig. 9a is a section taken on the line 9a-9a of Fig. 9.

As shown in Fig. 9 the blank is provided with similar groups of cuts 90, 92—92 and 94, however, the width of the slot 94 is less than the distance between the slots 90 and 92—92. A much narrower insert is placed in the slot 94 or none at all, as herein shown (Fig. 9a), so that when the mount is folded the lower end of the backboard is suspended at a lesser distance from the faceboard than its upper end and hence the bottom board and faceboard converge from their upper ends toward their lower ends.

Figure 11:
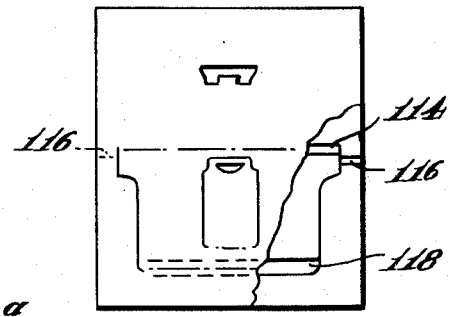
Fig. 11 is a plan view of a completed blank partly broken away from which the mount shown in Fig. 10 is made prior to folding.
Figure 10:
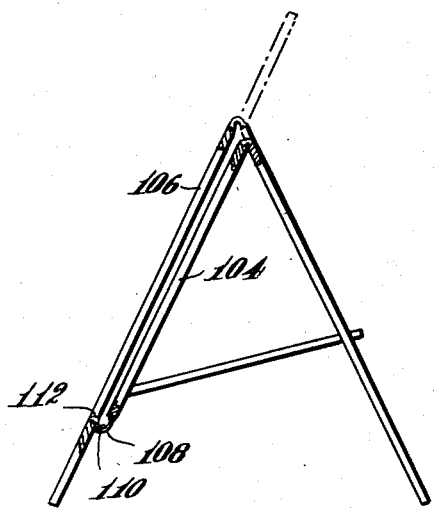
Fig. 10 is an elevation partly in vertical section showing a modified construction designed to provide a deep pocket at the lower edge of the faceboard opening.
Figure 12:
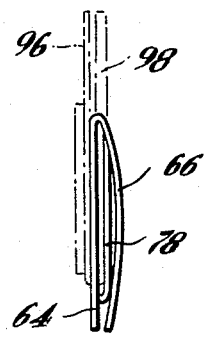
Fig. 12 shows a mount folded for shipment.

It may be desirable to have the lower hinge underslung somewhat so that the lower edge of the insert will underlap the lower edge of the opening in the faceboard by a definite amount. Accordingly, the mount may be modified as shown in Figs. 10 and 11. As therein shown, the backboard 104 lies behind the faceboard 106 as in the previously described mount, and substantially parallel thereto, but the lower hinge 108 has extra fullness therein so that it folds to provide an underslung pocket 110 extending below the lower edge 112 of the faceboard opening. To this end, as shown in Fig. 11, slots 114, 116—116 and 118 are made in the board, as described in the making of the form of the invention shown in Figs. 1 to 5. The insert in the lower wide slot 118 is, however, omitted so that when the blank is folded the excess of facing material, f, f' covering the wide slot 118 is pushed downwardly to form the pocket 110.

Figure 13:
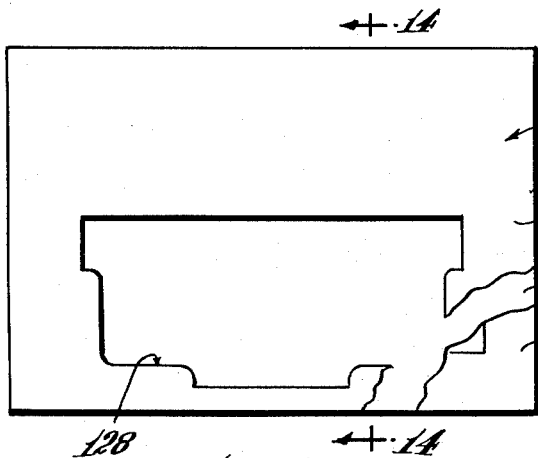
Fig. 13 is a front elevation of a mount such as shown in Figs. 7 to 9 inclusive, with the folder omitted and with a faceboard applied over the faceply so as to close the well at the front but to leave it open at the top and to provide an auxiliary pocket for a calendar pad.

Fig. 13 discloses in elevation a mount which comprises the basic structure illustrated in Figs. 1 to 11 inclusive, with a frontboard 120 applied to the faceboard 122. The frontboard 120 is comprised of a backply 124 and frontply 126, the two plies being joined at their edges by facing paper and the frontply having an opening 128 through it for receiving a calendar pad, the edges of which may be engaged between the plies marginally of the opening. As thus constructed, the frontboard 120 closes the well 130 at the front and conceals the top opening to the well as viewed from the front without obstructing access to it or interfering with thrusting an insert through the top opening into the well.

Figure 14:
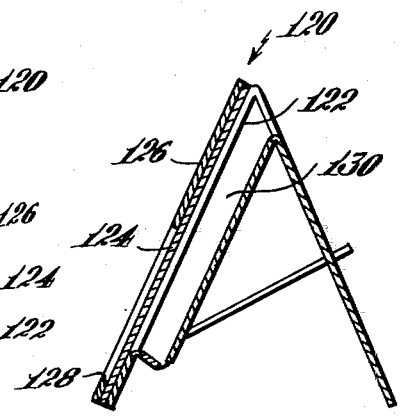
Fig. 14 is a section taken on the line 14—14 of Fig. 13.
Figure 15:
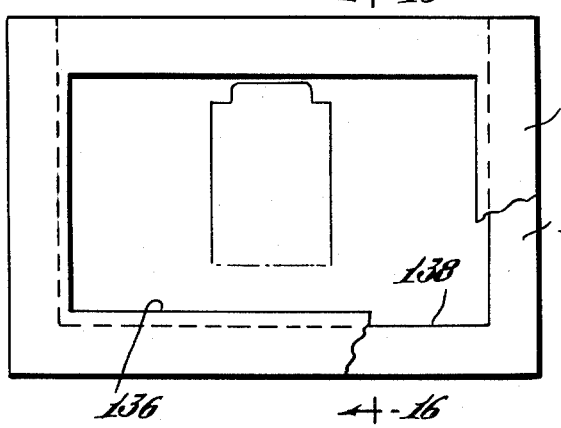
Fig. 15 is a front elevation of a mount such as shown in Figs. 7 to 9 inclusive, with the folder omitted and with a faceboard having an opening through it applied over the faceply of the basic structure so as to conceal the open top of the well from the front.
Figure 16:
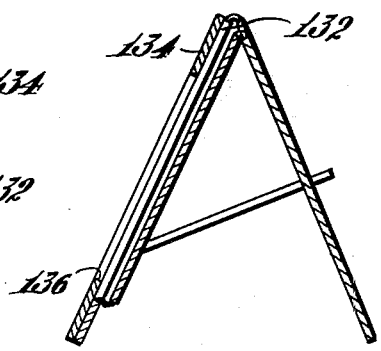
Fig. 16 is a vertical section taken on the line 16—16 of Fig. 15.

Figs. 14 and 15 show front and end elevations of the basic mount to the faceboard 132 of which has been fastened a frontboard 134. In this case, the frontboard is a single ply covered with a facing paper and has through it an aperture 136 of slightly smaller overall dimensions than the opening 138 in the faceboard behind it. The overlapping portion of the front-board provides retaining means for an insert placed in the well so that the opening in the faceboard need not be specially cut, as previously described, to provide retaining members and also provides at its top, means for concealing the open top of the well without interfering with or obstructing access to the well from the top.

Figs. 17, 18 and 19 illustrate still another form of the invention wherein the mount is adapted to be suspended from a wall or supported at its lower edge by a suitable supporting member, in place of the easel-type leg and brace heretofore shown. Referring to the figures, the mount 140 is comprised of a rigid backboard 142 having an upper part 144 of predetermined width and a lower part 146 of narrower width. A U-shaped faceboard 148 is spaced forwardly and parallel to the backboard and has spaced parallel legs 150, paralleling the lateral edges of the narrower lower portion of the backboard and a transverse leg 152, paralleling the transverse end of the narrower portion. The transverse leg of the faceboard is connected to the lower edge of the narrower portion of the backboard by a flexible hinge 154 and the upper ends of the legs 152 are connected to the backboard by flexible hinges 156. The hinges 156 are narrower than the legs and offset from their inner edges so as to provide an entrance mouth to the space between the backboard and the faceboard wider than the distance between the inner edges of the legs.

The flexible hinges are constituted by facing material applied to one or both sides of the front and backboards which bridge the gaps between the spaced parallel edges of the transverse leg of the faceboard and the lower edge of the backboard and the ends of the legs of the faceboard and the wider portion of the backboard.

As thus constructed, the backboard of the mount may contain an aperture 158, by means of which it may be suspended, or, as shown in Fig. 19, the lower edge of the mount may be thrust into a slot in a block 160.

The mount is constructed by providing a flat ply of stiff board 162, as shown in Fig. 20, and then by means of suitable dies, cutting slots 164 near its lateral edges and a slot 166 intermediate the inner ends of the slots 64 and parallel thereto. One or both sides of the board are now covered with a flexible covering or facing material 168, whereupon spaced parallel slits 170 are cut through the composite blank, extending upwardly from the opposite ends of the slot 166, to the slots 164 and then outwardly so as to intersect the inner ends of the slots 164. As thus constructed, the slots covered by the facing material provide the hinges referred to above and by the simple expedient of pushing the T-shaped section 172 and the U-shaped section 174 toward each other, the T-shaped section may be displaced rearwardly of the U-shaped section so as to provide a pocket or well 176, as shown in Fig. 18, into which an article may be thrust with its lateral edges disposed behind the inner edges of the faceboard, as shown in Fig. 17.

It should be noted that, unlike the device of Fig. 1 for example, wherein the backboard has the transverse slot 44 so that the upper part of the backboard folds down to form the leg 14, the device of Fig. 17 is devoid of anything corresponding in structure or function to said slot 40, so that the upper part 144 is always in the same plane with the lower part 146, thus providing a support for an upper, decorative part of a calendar pad or for the reception of advertising or other material on the mount itself.

This form of mount, which has no attached supporting leg or brace, is particularly simple, inexpensive and easy to store and ship since, when not in use, it can be made perfectly flat. It is, however, adapted to be fastened by means of adhesive, staples and the like, to any known easel support.

It should be understood that the present disclosure is for the purpose of illustration only and that this invention includes all modifications and equivalents which fall within the scope of the appended claims.

The present application is a continuation in part of my pending application Ser. No. 621,421, filed Nov. 19, 1956.

I claim:

1. An easel-type mount comprising a stiff one-piece front panel, a leg hinged at one end to one edge of the front panel for angular disposition with respect to the front panel, means for holding the front panel and leg at such an angle that the leg supports the front panel in an upwardly and rearwardly inclined position, said front panel having an opening in it defined by a lower edge parallel to the lower edge of the panel and spaced parallel side edges which extend therefrom all the way to the hinge at the top, so that the top of the opening is open-ended, a well inwardly of the opening, said well having a bottom constituted by a board suspended below the level of the front panel opening by hinge means connecting its lower end and upper end to the lower edge of the front panel opening and to the leg below the hinge line joining the front panel and the leg respectively, the hinge means at the lower end of the bottom panel being constituted by a narrow, rigid panel situated between the front panel and the lower end of the bottom panel and pivotally connected along its opposite edges respectively, to the lower edge of the opening in the front panel and the lower end of the bottom panel, the width of the narrow panel being less than the distance between the hinges connecting the front panel to the leg and bottom panel to the leg.

2. A mount according to claim 1, wherein there is means associated with the upper part of the backboard for supporting the mount.

3. A mount according to claim 1, wherein there is an aperture in the upper part of the backboard for suspending the mount.

4. A mount according to claim 1, wherein the wider portion of the backboard has a transversely extending hinge spaced from and parallel to the hinge joining the ends of the leg thereto, the ends of which terminate adjacent the leg hinges so that the part of the backboard beyond the hinge is foldable to an angular position with respect to the faceboard.

5. An easel-type mount comprising a stiff one-piece front panel, a leg hinged at one end to one edge of the front panel, said front panel having in it an opening inwardly of which is a well constituted by a bottom panel situated below the plane of the front panel and parallel to the opening therein, hinge means connecting the lower end of the bottom panel to the front panel at the lower edge of the opening therein, hinge means connecting the upper end of the bottom panel to the leg below the hinge connecting the front panel to the leg and a brace hinged to and extending rearwardly and downwardly from the bottom panel, said brace having at its distal end a tongue flanked by shoulders and an elongate aperture through it, one side of which is parallel to the shoulders and spaced therefrom by an amount substantially equal to the thickness of the board and said leg having a recess and inwardly projecting tab for engagement with the tongue and elongate apertures respectively, said shoulder being held firmly against the edge of the recess in the leg by engagement of the tab within the aperture in the tongue.

6. In an easel mount, a single ply blank comprising first and second panels disposed end to end, hinge means joining the adjacent ends of the panels, a third panel situated within the body of the blank with its major part in the first panel and the balance in the second panel, said third panel being divided from the first and second panels within which it lies along two sides paralleling the sides of the blank by spaced parallel cuts which extend from the first panel to the second panel, hinge means connecting the ends of the third panel to the first and second panels, the hinge means at the ends of the third panel to the first and second panels, the hinge means at the ends of the third panel lying at opposite sides of and parallel to the hinge means joining the first and second panels, a fourth panel situated entirely within the third panel, said fourth panel being divided from the third panel along two sides at the end adjacent the hinge means joining the first and second panels, and hinged thereto at its opposite end, said second panel containing a slot for receiving the free end of the fourth panel, said panels and said hinges all lying in a single plane and said panels being foldable on their respective hinges to set the mount up with the remote ends of the first and second panels constituting the feet which support the mount upright, with the first panel inclined forwardly and downwardly and the second panel inclined rearwardly and downwardly, the third panel disposed behind the first panel and spaced therefrom leaving an opening in the first panel corresponding in shape to that of the third panel which constitutes a pocket for receiving an insert placed therein on the third panel and the fourth panel folded downwardly from the third panel with its free end engaged within the aperture in the second panel.

7. A mount comprising a backboard having an upper portion of predetermined transverse width and a lower portion of narrower width, a U-shaped faceboard spaced forwardly of and parallel to the backboard, said faceboard having spaced parallel legs paralleling the lateral edges of the narrower lower portion of the backboard and a transverse leg paralleling the transverse end of the narrower portion, a flexible hinge element extending rearwardly from the transverse leg of the faceboard to the parallel transverse lower edge of the narrower portion of the backboard and forming the sole connection between these edges, flexible hinge elements extending rearwardly from the upper ends of the legs to the upper portion of the backboard, said flexible hinge elements constituting the sole connection between said upper ends of the legs and the backboard, being narrower in width than the legs and being offset from the inner edges of the legs, leaving openings between the backboard and the upper ends of the legs inwardly of the elements which are in communication with the space between the backboard and the faceboard, through which an insert may be thrust to dispose its lateral edges behind the inner edges of the legs, said flexible hinge element connecting the lower leg of the faceboard to the lower edge of the backboard constituting a support for the lower edge of the insert.

8. A mount comprising a backboard having an upper portion of predetermined transverse width and a lower portion of narrower width, a U-shaped faceboard having spaced legs and a transverse connecting leg disposed about the sides and end of the narrower portion of the backboard with the parallel legs paralleling the lateral edges of the narrower portion and the transverse leg paralleling the lower edge of the narrower portion, said parallel legs having outer lateral edges which coincide with the lateral edges of the upper portion of the backboard, and means supporting the faceboard disposed about the narrower portion in a plane spaced forwardly therefrom, and parallel thereto including a flexible hinge element extending rearwardly from the transverse leg to the lower edge of the narrower portion of the backboard which forms a supporting ledge for an insert disposed in the space between the faceboard and the backboard, and flexible hinge elements extending from the upper ends of the legs rearwardly to the wider portion of the backboard, said last-named hinge elements being narrower than the upper ends of the legs and offset from their inner edges so as to provide an entrance mouth to the space between the backboard and the faceboard wider than the distance between the inner edges of the legs.

9. A blank for use in making a calendar mount, said blank comprising a substantially rectangular piece of sheet material having parallel incisions spaced from and parallel to opposite side edges respectively, of the blank, the forward ends of the incisions being spaced from the front edge of the blank and the rear ends of the incisions being spaced from the rear edge of the blank, the blank having alined elongate flexible areas extending from the rear ends of the respective incisions to the side edges of the blank, and between the forward ends, the incisions and said flexible areas defining a substantially U-shaped forward portion and a substantially T-shaped rear portion, said flexible areas so uniting the transverse member of the U-shaped portion to the forward end of the leg of the T-shaped portion, and the legs of the U-shaped portion to the T-shaped portion, that the T-shaped portion may be depressed so as to lie in a plane behind that of the U-shaped portion, thereby providing a well in which a calendar pad may be placed, the flexible area which unites the transverse member of the U-shaped portion to the T-shaped portion being so constructed and arranged as to form an abutment for the calendar pad when the latter is disposed in the well.

10. A blank for use in making a calendar mount, said blank comprising a substantially rectangular piece of sheet material having parallel incisions spaced from and parallel to opposite side edges respectively, of the blank, the forward ends of the incisions being spaced from the front edge of the blank and the rear ends of the incisions being spaced from the rear edge of the blank, the blank having aligned elongate flexible areas extending from the rear ends of the respective incisions to the side edges of the blank, and between the forward ends, the incisions and said flexible areas defining a substantially U-shaped forward portion and a substantially T-shaped rear portion, said flexible areas and the flexible means which unites the transverse member of the U-shaped part to the T-shaped part constituting a parallel-linkage whereby the T-shaped part may be moved rearwardly of the U-shaped part to provide a well for the reception of the calendar pad.

References Cited in the file of this patent

UNITED STATES PATENTS

| | | |
|---|---|---|
| 445,174 | Hagelberg | Jan. 27, 1891 |
| 2,251,605 | Williamson | Aug. 5, 1941 |
| 2,563,357 | Nichols | Aug. 7, 1951 |
| 2,902,785 | Nichols | Sept. 8, 1959 |

FOREIGN PATENTS

| | | |
|---|---|---|
| 802,625 | France | June 13, 1936 |